United States Patent

[11] 3,630,097

[72] Inventor Tatsuo Kuratomi
 4-2-18 Hamatake, Chigasaki, Japan
[21] Appl. No. 876,725
[22] Filed Nov. 14, 1969
[45] Patented Dec. 28, 1971
[32] Priority Mar. 24, 1969
[33] Japan
[31] 44/22200

[54] BUSH CHAIN
 4 Claims, 4 Drawing Figs.
[52] U.S. Cl. .................................................. 74/245 R,
 74/245 LP, 74/250 R, 74/255 R
[51] Int. Cl. ........................................................ F16g 13/02
[50] Field of Search ............................................ 74/245 R,
 245 LP, 255 R, 250 R, 251 R; 59/5, 6, 7

[56] References Cited
UNITED STATES PATENTS
3,135,128  6/1964  Rudolph ....................... 74/245

*Primary Examiner*—Leonard H. Gerin
*Attorney*—Otto John Munz

ABSTRACT: A bush chain comprising inner links having two bush portions and holes therein; and outer links having also two bush portions and holes therein, bush portions and holes of said cylindrical pin bearings in said inner and outer links, said bearings having surfaces longer than the thickness of said links, a sleeve fixed in said holes of said inner links in alignment with said outer links; a pin fixed in the holes of said outer links at both ends to said bush portions of said outer links; the bearing surfaces of the holes of the bush portions of the inner links and of the holes of the bush portions of the outer links being longer than the thickness of said inner and outer links.

*INVENTOR*

TATSUO KURATOMI

BY *Otto John Munz*

ATTORNEY

BUSH CHAIN

CROSS-REFERENCE TO RELATED APPLICATION

Priority of corresponding Japanese application No. 22200/44, filed Mar. 24, 2969 is claimed under the convention.

SUMMARY OF THE INVENTION

The present invention relates to a bush chain.
The object of the present invention is to provide a bush chain having a very high resistance to tension.

BRIEF DESCRIPTION OF THE DRAWINGS

In the accompanying drawing.

DESCRIPTION OF THE PREFERRED EMBODIMENTS

Figure 1:
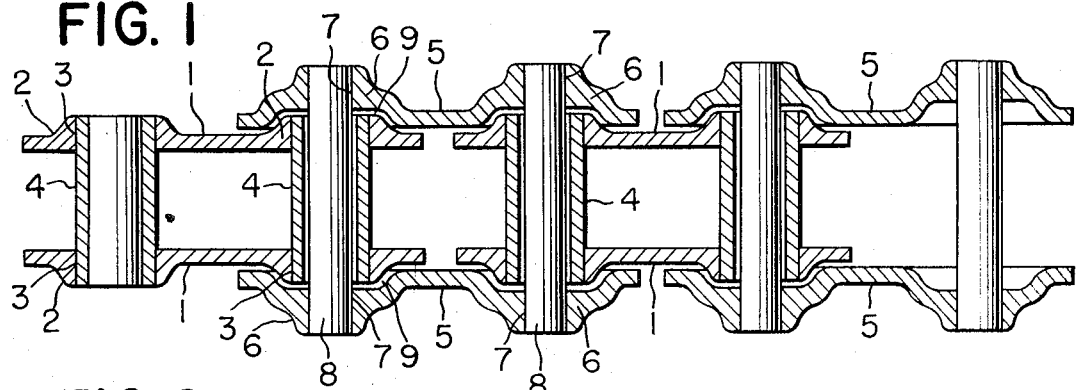
FIG. 1 is a cross-sectional plan view of a bush chain according to the present invention.
Figure 2:
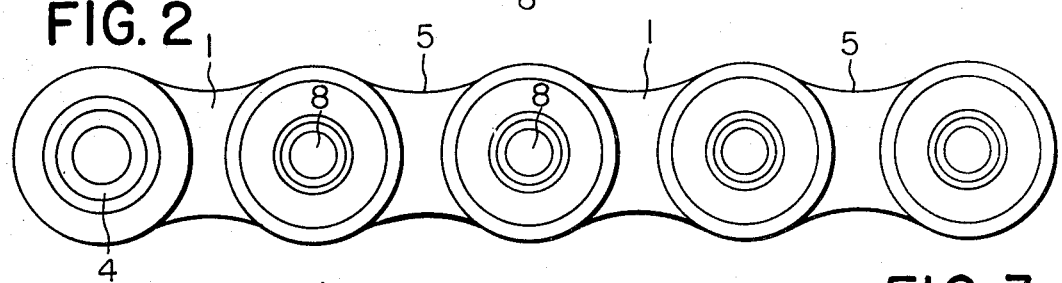
FIG. 2 is a side elevation of the bush chain of FIG. 1.

Referring to FIGS. 1 and 2, an inner link 1 is provided with two outwardly projecting bush portions 2 having a hole 3. A sleeve 4 is fitted at both ends in the holes 3 of the inner links 1. An outer link 5 is also provided with two bush portions 6 having an inside recess 9 with which the bush portion 2 is engaged. The bush portion 6 has further a hole 7. The bush chain is assembled by arranging the inner links 1 between the outer links 5, inserting a pin 8 into the sleeve 4 of the inner links 1 and fixing it at both ends in the holes 7 provided in the bush portions 6 of the outer links 5.

Figure 3:
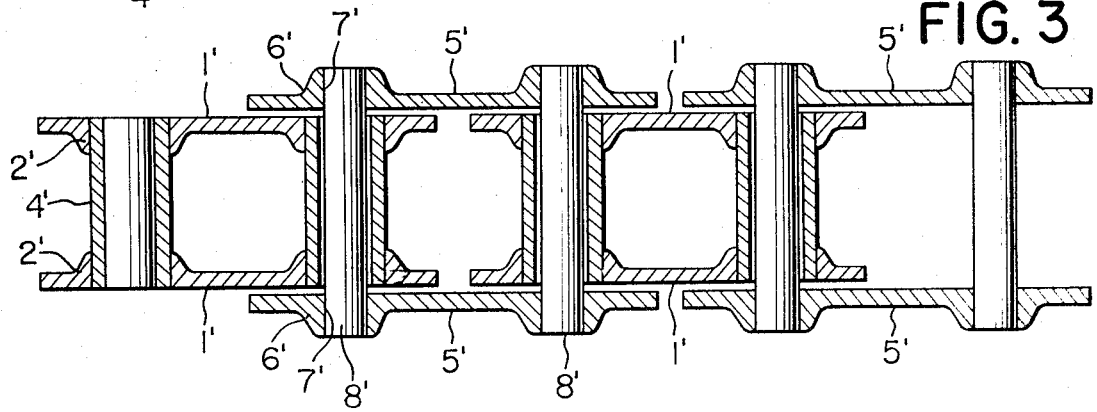
FIG. 3 is a cross-sectional plan view of another bush chain according to the present invention.
Figure 4:
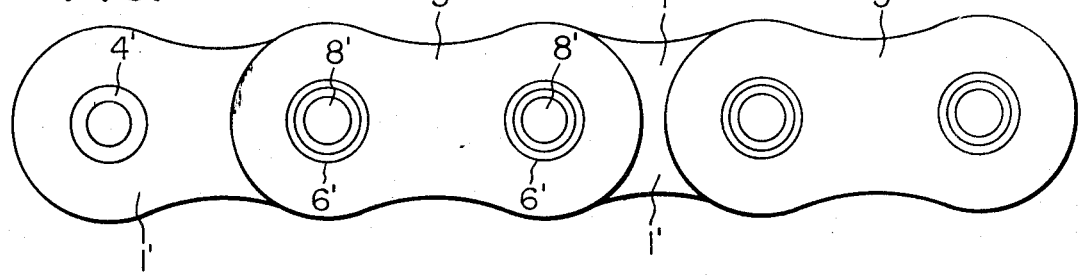
FIG. 4 is a side elevation of the bush chain of FIG. 3.

FIGS. 3 and 4 show a modification of the bush chain in FIGS. 1 and 2. An inner link 1' is similar to the inner link 1, but the former has inwardly projecting bush portions 2'. The bush portions 2' of the inner links 1' are connected by a sleeve 4'. An outer link 5' is also similar to the outer link 5. A pin 8' extending through the sleeve 4' of the inner links 1' is fixed at both ends in the holes 7' provided in the bush portions 6' of the outer links 5'.

According to the present invention, the surface of revolution of inner and outer links of a chain is constituted by a cylindrical surface between sleeve and pin, so that the area of contact of both parts is remarkably large compared to that of the conventional chains. Therefore, an increased resistance to tension is achieved. In addition, the bush chain according to the present invention has an advantage that it is not expanded by a tension.

What is claimed is:

1. A bush chain comprising inner links having two bush portions and holes therein; and outer links having also two bush portions and holes therein, bush portions and holes of said cylindrical pin bearings in said inner and outer links, said bearings having surfaces longer than the thickness of said links, a sleeve fixed in said holes of said inner links in alignment with said outer links; a pin fixed in the holes of said outer links at both ends to said bush portions of said outer links; the bearing surfaces of the holes of the bush portions of the inner links and of the holes of the bush portions of the outer links being longer than the thickness of said inner and outer links.

2. A bush chain comprising inner links having two bush portions and holes therein; outer links having also two bush portions and holes therein, a sleeve fixed in said holes of said inner links, in alignment with said outer links; a pin mounted through said holes fixed at both ends to said bush portions of said outer links, said bush portion of said outer links having an inside recess and said bush portion of said inner link projecting outwardly so as to be engaged with said recess.

3. A bush chain comprising inner links having two bush portions and holes therein; and outer links having also two bush portions and holes therein, a sleeve fixed in said holes of said inner links, in alignment with said outer links; a pin mounted through said holes fixed at both ends to said bush portions of said outer links, said pin fixed at both ends in said holes of said outer links and rotatable in said sleeve.

4. A bush chain as set forth in claim 1, wherein said bush portion of said inner link is projecting inwardly and the inside surface of said outer link is formed to be flat.

* * * * *